July 14, 1970  MATAICHI TAJIMA ETAL  3,520,531
PHOTOSENSITIVE SHEET MATERIAL FEEDING DEVICE
Filed March 19, 1968  3 Sheets-Sheet 1
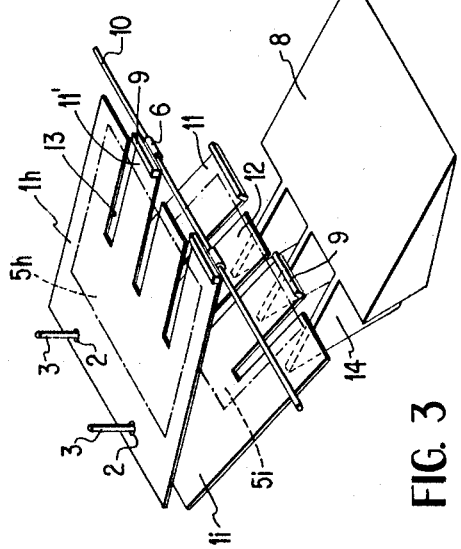
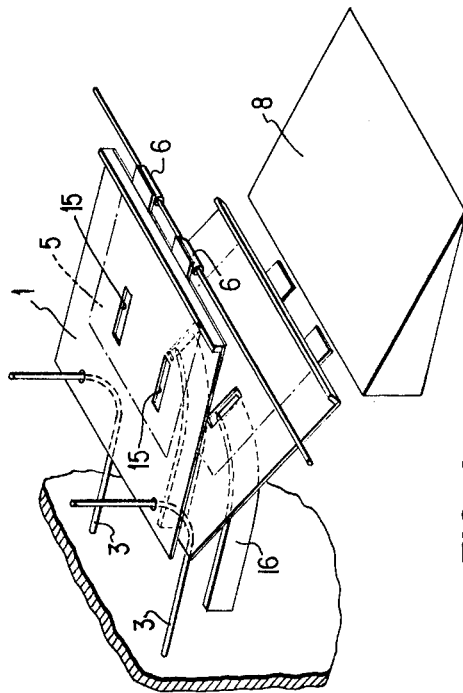
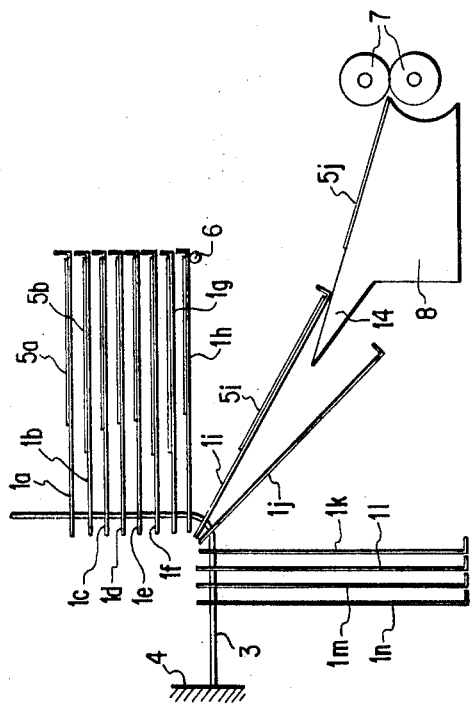
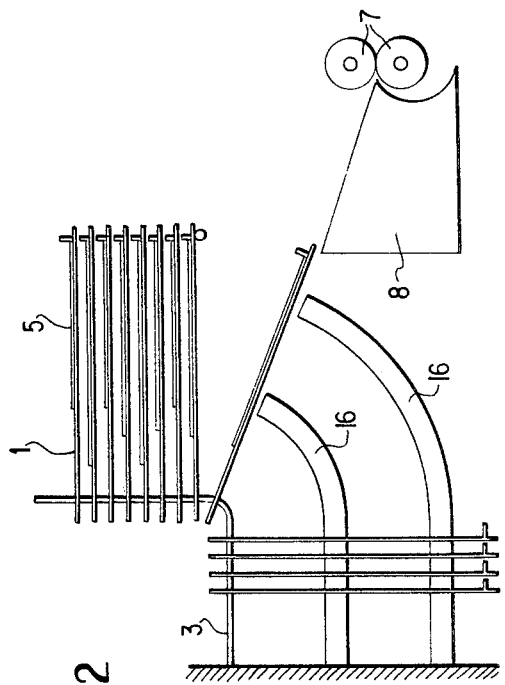
INVENTORS.
MATAICHI TAJIMA
TOSHIO KUBOYA
BY *Sughrue, Rothwell, Mion, Zinn & Macpeak*
ATTORNEYS.

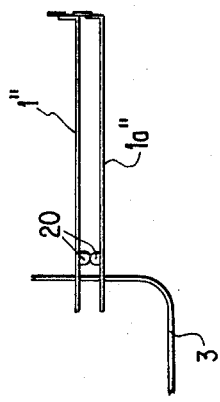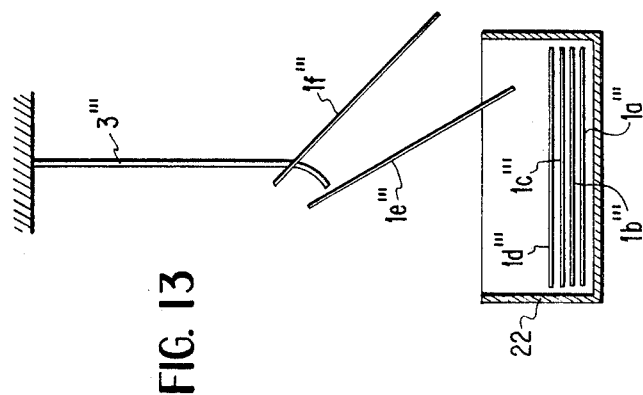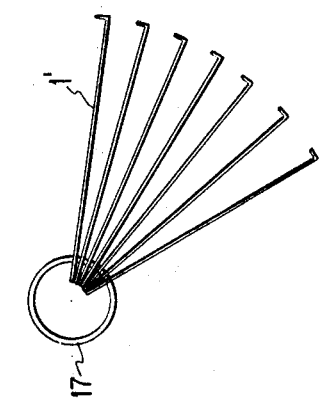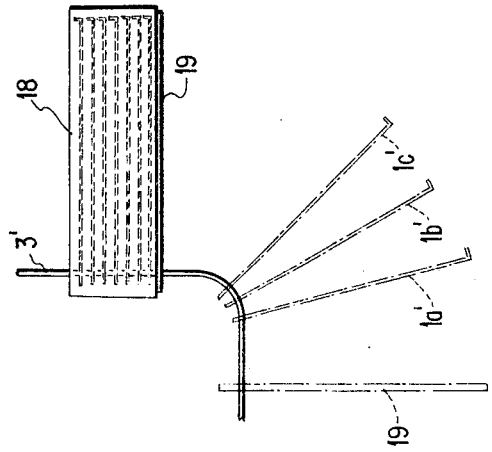

United States Patent Office 3,520,531
Patented July 14, 1970

3,520,531
PHOTOSENSITIVE SHEET MATERIAL FEEDING DEVICE
Mataichi Tajima and Toshio Kuboya, Kanagawa, Japan, assignors to Fuji Shashin Film Kabushiki Kaisha, Kanagawa, Japan
Filed Mar. 19, 1968, Ser. No. 714,292
Claims priority, application Japan, Mar. 20, 1967, 42/17,333
Int. Cl. B65h 3/44
U.S. Cl. 271—9                    7 Claims

ABSTRACT OF THE DISCLOSURE

Sequential gravity feeding of sheets individually carried by a plurality of stacked sheet receiving plates onto an inclined support by releasing the lowermost plate and edge pivoting the same.

---

The present invention relates to a device for sequentially feeding photosensitive material in sheet form, such as dry plates, photographic film, photographic papers and the like, and in particular, to a device for feeding said photographic material sheets in an exact manner in sequence during manufacturing, picture taking or photographic film processing as in film loading or feeding.

Photosensitive material in the form of sheets are normally fed by devices which remove the photosensitive material sheets, one by one from a storing box or other container, at preset time intervals. Mechanisms have been employed which employ suction plates for carrying the photosensitive material by vacuum or have employed other means for discharging the photosensitive material sheets from a narrow slot. Where vacuum suction is employed, the photosensitive material sheet is left with a residual stress and further, since the density of the individual sheets may vary, as well as the size of the photosensitive material sheet, there is some possibility that more than one sheet is discharged at the same time. In the other type of apparatus where the photosensitive material sheets are discharged through a slot or the like, the operation is inaccurate, especially where the sheet material is slightly curled, as in the case where it comprises a photosensitive film.

It is, therefore, an object of the present invention to provide an improved feeding device for feeding, in sequence, photosensitive material film sheets which does not affect the physical or photographic properties of the sheets being fed.

It is another object of this invention to provide a photosensitive material sheet feeding device which accurately removes and feeds the sheets in proper time sequence.

It is a further object of this invention to provide a photosensitive material sheet feeding device of this type which may readily allow selection of any number of sheets from a first lot to be added to the previous lot.

Other objects and advantages will become apparent from the following description taken in conjunction with the accompanying drawings, in which:

FIG. 1 is a schematic, elevational view of one embodiment of the present invention.

FIG. 2 is a schematic, elevational view of a second embodiment of the present invention.

FIG. 3 is a perspective view of a portion of the device shown in FIG. 1 stressing the means for removing the photosensitive material sheets from the feed plates.

FIG. 4 is a perspective view of a portion of the device shown in FIG. 2 showing the means for removing individually and in sequence the photosensitive material sheets during gravity release and pivoting of the same.

FIG. 10 is a side elevational view of a portion of an alternate photosensitive material sheet feeding device of the present invention.

FIG. 11 is a side elevational view of a portion of yet another embodiment of the present invention.

FIG. 12 is a side elevational view of a portion of a sheet feed device in alternate form.

FIG. 13 is a somewhat schematic, side elevational view of a portion of the device of the present invention showing how the feed plates are filed.

Figure 7:
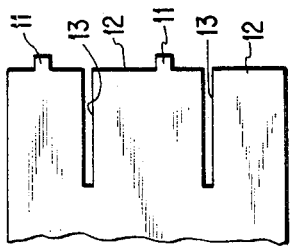
FIG. 7 is a plan view of yet another form of feed plate for the device of the present invention.
Figure 6:
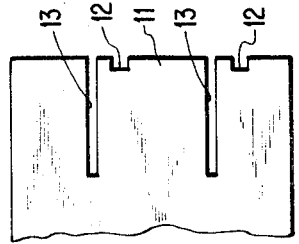
FIG. 6 is a plan view of another form of feed plate of the device of the present invention.
Figure 5:
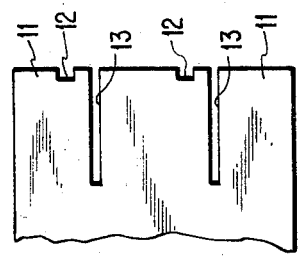
FIG. 5 is a plan view of one form of feed plate for use in a device of the present invention.

Referring to the drawings, there is shown in FIG. 1, one embodiment of the present invention employing a plurality of feed or support plates 1a through 1n, inclusive, which are filed in requisite order through the use of filing rod 3 and filing perforations provided at the left-hand edge of the feed plates. Filing rod 3 is fixed to wall 4, as indicated. The photosensitive material in sheet form is placed individually on its respective feed or support plate, for instance, photosensitive material sheet 5a rests on feed plate 1a, while photosensitive material sheet 5b is placed on feed plate 1b. Thus, the photosensitive material sheets are stored individually by respective feed plates. Supporting key 6, as shown, prevents downward movement of the stack of plates 1a through 1h and specifically, plate 1h, thereby storing feedout plates 1a through 1h in horizontal stacked position. A pair of supply rollers 7—7 are provided at the bottom of inclined support or receiving plate 8 so as to positively feed the individual and sequentially fed sheets as they move as a result of gravity from the inclined plates and the inclined surface of receiving plate 8 into the nip formed by the rollers.

The operation of the feed device, in the form of the embodiment shown in FIGS. 1 and 3, is explained by referring to these figures. Feed plates 1h and 1i are carried by the file on filing rods 3 through filing perforations 2 with the plates moving from their horizontal position to a vertical position by pivoting along the curved portion of filing rods 3 as indicated in FIG. 3. The stacking filing plates moves as a result of release of supporting key 6 which is carried by a sliding shaft 10. When the sliding shaft 10 is moved to the left by means of a solenoid (not shown), the supporting key is displaced from the leaf portion 11 and to the recess portion 12, whereupon the feed plate 1i moves from its horizontal to its vertical position as a result of its own weight. However, the succeeding feed plate 1h is held in the position shown since the supporting key 6 is in contact with leaf portion 11 of this particular plate. The leaf portion and the recess portion are alternately positioned relative to support key 6 which reciprocates from left to right with a constant amplitude. The leaf portion 11 and recess portion 12 of each feed plate may be shaped as shown in FIGS. 5 through 9, in which case, like numerals represent like elements.

For transferring the photosensitive sheet material from its feed or support plate to the inclined receiving plate 8, the recessed or cut portion 13 of each feed plate aligns itself with the projecting portion 14 of the receiving plate 8 insofar as the embodiment of FIG. 1 and FIG. 3 is concerned, and when the feed plate, during its pivoting from horizontal to vertical position, rotates past the plane of the inclined surface of the receiving plate 8, the photosensitive material sheet is stopped by the receiving plate 8, while the support or feed plate continues to rotate into vertical position and the discharged photosensitive material sheet slides, by gravity, down the surface of the receiving plate 8 and into the nip of roller 7—7 (FIG. 1). In moving from a true horizontal position to an inclined position, the photosensitive material sheets, such as sheet 5i (FIG. 3), slides down the surface of feed or support plate 1i, again by its own weight; but the photosensitive material sheet is stopped by ridge 9 at the right-hand edge of the feed or support plate 1i. The ridge 9 also ensures proper edge alignment of the photosensitive material sheet prior to discharge of the same by projection portions 14 of the receiving plate 8. When the feed plate moves from the horizontal position to the vertical position, the recesses 13 receive projection portions 14 of the receiving plate 8 and at this point, the photosensitive material sheet 5j on the feed plate 1i is actually left on projection portions 14 of the receiving plate 8. Gravity feed continues to cause the ejected sheet to move downwardly between rollers 7—7. In FIG. 1, the feed plates 1a through 1h, inclusive, are stacked in wait position, the feed plate 1i is in active feed position with the sheet 5i in contact with projections 14, while the feed plate 1j has moved past the receiving plate 8 with its photosensitive material sheet 5j in the process of sliding down and into the rollers 7—7. Feed plates 1k through 1n, inclusive, are in full vertical and adjacent but parallel position after finishing their part of the operation.

In the alternate embodiment of FIGS. 2 and 4, the feed plates, such as plate 1, are provided with perforations 15 which actually receive curved projecting arms 16 which are positioned in spaced, parallel relationship such that the photosensitive material sheet is left on the top face of the arm 16 during pivoting of the support plate and then slides down onto the receiving plate 8 in the same manner as the previous embodiment by its own weight.

In yet another embodiment of the present invention, as shown in FIG. 10, seven feed plates, such as feed plate 1', are filed by being carried on ring 17 for gravity movement through the arc of horizontal to vertical position in like manner to the previous embodiments. In this embodiment, as the feed plates, once filed, are not required to be refiled, there is no fear that the order of filing should be inadvertently changed.

In the embodiment of FIG. 11, there is shown a portable, lightproof box 18, including bottom 19, the box carrying a series of feed or support plates, such as 1a', 1b' and 1c', carried by the filing rod 3'. The photosensitive material sheets supported by respective plates in an individual manner are removed in the same manner as previously described with reference to the embodiments of FIGS. 1 and 2, for example. That is, the lightproof box 18, including bottom 19, receives the vertical portion of the filing rod 3 and the feed plates 1a', 1b' and 1c', etc., move out from the box 18 after the bottom or cover portion 19 is moved to the dotted line position shown.

In FIG. 12, there is shown another embodiment of the present invention wherein the feed plates 1" and 1a" are provided with light-shielding members 20 at the marginal or side portions thereof, whereby the photosensitive material may be easily handled in the light without prematurely exposing the same.

Figure 9:
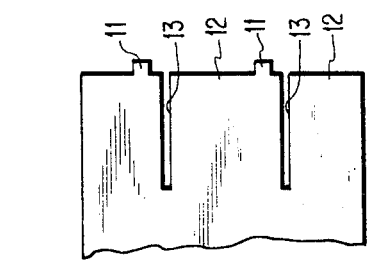
FIG. 9 is a plan view of a feed plate of alternate form for use in the device of the present invention.
Figure 8:
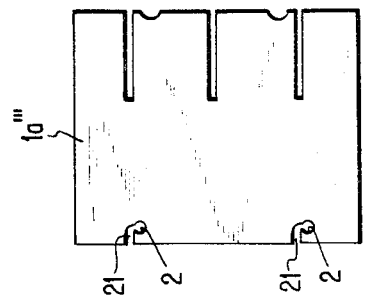
FIG. 8 is a plan view of yet a fourth feed plate for the device of the present invention.

Referring to FIG. 9, the feed plate 1a''' is provided with a narrow cut or recess portion 21 which extends outwardly from respective filing holes 2. The purpose of the cut-out portion 21 is to allow the plate to be easily loaded onto the filing rod 3''' (FIG. 13) after the plates have been arranged in box 22 and positioned beneath the filing rod 3''', in case the plates fall down into the box 22, which, in this case, is from the filing rod 3'' which has its end of the vertical section fixed to the wall.

In any case, with all of the embodiments described above, as the movement of the feed plate is long, it is easy to control the exact moment of feeding the photosensitive material sheet from its support plate by controlling the release of the lowermost feed or support plate from the horizontal stack by means of electric contacts or a photoelectric or electromagnetically controlled switch. Since the photosensitive material sheets are not removed by suction devices in accordance with the present invention, the photosensitive material sheets, after removal, are not provided with residual stress and since they are not sequentially discharged from a slot, even curled photosensitive films may be sequentially fed without trouble. Thus, the photosensitive material sheets may be removed and fed in an exact manner in a desired sequence without any damage to the sheets during feeding.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A sheet feeding device comprising a plurality of sheet feed plates, means for initially maintaining said plates in vertical stacked relationship with individual sheets carried by respective plates, and means for releasing, in sequence, the bottommost plate to effect discharge of the sheet carried thereby; discharge means for removing said sheets from said released plate, filing rod means for maintaining said plates in alignment at all times, said filing rod means having a lower end portion secured to a vertical wall of said device, said wall acting as a stop to retain said feed plates on said filing rod means in the same order following discharge of the sheet carried thereon as they were placed in their initial position.

2. The sheet feeding device of claim 1, wherein said feed plates are connected to said filing rod means along one lateral edge to allow said released plate to pivot about said lateral edge to facilitate lateral discharge by gravity of said sheet from said plate across a second lateral edge.

3. The sheet feeding device of claim 2, wherein said second lateral edge includes an upturned lip portion for retaining said sheets placed thereon on said plates until said plates are aligned with said discharge means.

4. The sheet feeding device as claimed in claim 2 wherein alternate ones of said plates have recesses extending from said second lateral edges inwardly and aligned with each other, the intermediate plates also having aligned recesses which are offset with respect to the recesses of adjacent plates, said feeding device further including a keying member having a projecting portion which reciprocates beneath said feed plate and having a width corresponding to the width of said recesses and an amplitude equal to the distance from the recess portion of one feed plate to the recess portion of the next succeeding feed plate.

5. The sheet feeding device as claimed in claim 2 wherein said feed plate includes at least one perforation including the sheet carried thereby, a stationary means comprising a curved projection arm means fixedly positioned in the path of said perforation, whereby, upon release of a sheet carrying plate, said perforation, upon receiving said projection arm means, separates said sheet from said plate and allows lateral discharge thereof.

6. The sheet feeding device as claimed in claim 2, wherein said feed plate includes at least one recess extending from said second lateral edge inwardly and stationary means positioned in the path of said released plate recess for contacting said sheet to remove the sheet therefrom during downward movement of said released plate.

7. The feeding device of claim 6 further comprising an inclined sheet receiving plate positioned on the discharge side and below said vertical plate stack, and said stationary means comprising a projection extending from said receiving plate with the sheet contact surface thereof being coplanar with said inclined receiving plate.

References Cited

UNITED STATES PATENTS 2,088,856  8/1937  Heiland _____ 221—89
2,815,147  12/1957  Jenkins _____ 221—89

FOREIGN PATENTS 268,339  Switzerland.

RICHARD E. AEGERTER, Primary Examiner

U.S. Cl. X.R.

221—89